(12) United States Patent  (10) Patent No.: US 8,143,805 B2
Peng  (45) Date of Patent: *Mar. 27, 2012

(54) SYSTEM AND METHOD FOR SELECTIVELY DIMMING AN LED

(75) Inventor: Chris Peng, Walnut, CA (US)

(73) Assignee: Permlight Products, Inc., Tustin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/689,201

(22) Filed: Jan. 18, 2010

(65) Prior Publication Data

US 2010/0237790 A1   Sep. 23, 2010

Related U.S. Application Data

(63) Continuation of application No. 11/506,709, filed on Aug. 18, 2006, now Pat. No. 7,649,327.

(60) Provisional application No. 60/802,319, filed on May 22, 2006.

(51) Int. Cl.
*H05B 37/02* (2006.01)
*H05B 39/00* (2006.01)

(52) U.S. Cl. ..................... 315/291; 315/312

(58) Field of Classification Search .............. 315/210, 315/219, 200 R, 312
See application file for complete search history.

(56) References Cited

U.S. PATENT DOCUMENTS

| | | | |
|---|---|---|---|
| 5,170,068 A * | 12/1992 | Kwiatkowski et al. ......... 307/31 |
| 5,278,432 A | 1/1994 | Ignatius et al. | |
| 5,313,187 A * | 5/1994 | Choi et al. | |
| 5,430,356 A * | 7/1995 | Ference et al. ............. 315/291 |
| 5,661,374 A | 8/1997 | Cassidy et al. | |
| 5,918,962 A | 7/1999 | Nagno | |
| 6,045,240 A | 4/2000 | Hochstein | |
| 6,150,771 A | 11/2000 | Perry | |
| 6,285,139 B1 | 9/2001 | Ghanem | |
| 6,396,466 B1 | 5/2002 | Pross et al. | |
| 6,396,718 B1 | 5/2002 | Ng et al. | |
| 6,400,102 B1 | 6/2002 | Ghanem | |
| 6,433,493 B1 | 8/2002 | Ilyes | |
| 6,483,254 B2 | 11/2002 | Vo et al. | |
| 6,528,954 B1 | 3/2003 | Lys et al. | |
| 6,548,967 B1 | 4/2003 | Dowling et al. | |
| 6,570,505 B1 | 5/2003 | Malenfant | |
| 6,578,986 B2 | 6/2003 | Swaris et al. | |
| 6,608,485 B2 | 8/2003 | St-Germain | |
| 6,617,560 B2 | 9/2003 | Forke | |
| 6,624,638 B2 | 9/2003 | St-Germain | |

(Continued)

OTHER PUBLICATIONS

Osram Opto Semiconductors, GmbH, Markus Hofman, "Comparison of LED Circuits", Application Note, May 3, 2004.

(Continued)

*Primary Examiner* — Douglas W Owens
*Assistant Examiner* — Minh D A
(74) *Attorney, Agent, or Firm* — Knobbe, Martens, Olson & Bear, LLP

(57) ABSTRACT

Embodiments of the present disclosure include an LED ballast circuit for dimming one or more LEDs using a phase controlled dimmer switch. The LED ballast circuit has a power conditioning unit which includes a substantially fixed duty cycle clock for outputting a clock cycle and a transformer configured to store energy and discharge a substantial portion of the stored energy once per clock cycle in order to power one or more LEDs. The LED ballast circuit and load collectively behave like a resistor.

30 Claims, 9 Drawing Sheets

U.S. PATENT DOCUMENTS

| | | | |
|---|---|---|---|
| 6,642,666 | B1 | 11/2003 | St-Germain |
| 6,659,622 | B2 | 12/2003 | Katogi et al. |
| 6,762,563 | B2 | 7/2004 | St-Germai et al. |
| 6,788,006 | B2 | 9/2004 | Yamamoto |
| 6,846,093 | B2 | 1/2005 | Swaris et al. |
| 6,880,957 | B2 | 4/2005 | Walters |
| 6,917,166 | B2 | 7/2005 | Ito |
| 6,975,079 | B2 | 12/2005 | Lys et al. |
| 7,038,399 | B2 * | 5/2006 | Lys et al. .................... 315/291 |
| 7,064,498 | B2 | 6/2006 | Dowling et al. |
| 7,064,674 | B2 | 6/2006 | Pederson |
| 7,067,986 | B2 | 6/2006 | Wong |
| 7,102,172 | B2 | 9/2006 | Lynch et al. |
| 7,114,831 | B2 | 10/2006 | Popovich et al. |
| 7,116,052 | B2 | 10/2006 | Ito |
| 7,186,003 | B2 | 3/2007 | Dowling et al. |
| 7,215,086 | B2 | 5/2007 | Maxik |
| 7,252,408 | B2 | 8/2007 | Mazzochette |
| 7,306,353 | B2 | 12/2007 | Popovich |
| 7,329,998 | B2 * | 2/2008 | Jungwirth .................... 315/291 |
| 7,387,406 | B2 | 6/2008 | Swaris et al. |
| 7,488,097 | B2 | 2/2009 | Reisenauer et al. |
| 7,490,951 | B2 | 2/2009 | Klipstein et al. |
| 7,649,327 | B2 | 1/2010 | Peng |
| 2001/0032985 | A1 | 10/2001 | Bhat et al. |
| 2003/0063463 | A1 | 4/2003 | Sloan et al. |
| 2003/0072117 | A1 | 4/2003 | Maekawa |
| 2004/0251854 | A1 * | 12/2004 | Matsuda et al. .............. 315/291 |
| 2005/0062440 | A1 | 3/2005 | Lys et al. |
| 2005/0128751 | A1 | 6/2005 | Roberge |
| 2005/0237005 | A1 | 10/2005 | Maxik |
| 2005/0243552 | A1 | 11/2005 | Maxik |
| 2006/0093017 | A1 * | 5/2006 | Gong et al. ................... 375/134 |
| 2006/0119287 | A1 | 6/2006 | Campbell |
| 2007/0007558 | A1 | 1/2007 | Mazzochette |
| 2007/0041220 | A1 | 2/2007 | Lynch |
| 2007/0069663 | A1 | 3/2007 | Burdalski et al. |
| 2007/0267984 | A1 | 11/2007 | Peng |
| 2008/0088248 | A1 | 4/2008 | Myers |
| 2008/0310162 | A1 | 12/2008 | Thomas et al. |
| 2009/0295300 | A1 | 12/2009 | King |
| 2009/0296384 | A1 | 12/2009 | Van de Ven et al. |

OTHER PUBLICATIONS

Osram Opto Semiconductors, GmbH, Timothy Dunn, "Driving the Golden Dragon LED", Application Note, Feb. 2, 2005.

* cited by examiner

SYSTEM AND METHOD FOR SELECTIVELY DIMMING AN LED

RELATED APPLICATIONS

This application is a continuation of U.S. application Ser. no. 11/506,709, filed Aug. 18, 2006, now U.S. Pat. No. 7,649,327, which claims the benefit of U.S. application Ser. No. 60/802,319, which was filed on May 22, 2006, the entirety of which is hereby incorporated by reference.

FIELD OF THE INVENTION

The present invention relates to a system and method for dimming a light emitting diode (LED). More particularly, the present invention relates to an isolated dimmable LED ballast driver.

BACKGROUND

The search for a better light bulb has been going on for years. Recently the development of high-brightness LEDs has vastly improved the efficiency and reliability of these light sources. However, the LED operates in a fundamentally different way than incandescent or even fluorescent lamps. This means that LEDs generally are not connectable directly with existing lighting fixtures. Ballast circuits are used to make existing lighting fixtures operable with LEDs. Ballast circuitry is often complex and expensive, making LED lighting expensive to operate. Another drawback of current ballast circuits is that they generally do not work consistently with conventional phase-modulated dimmer switches.

SUMMARY

Aspects of the present disclosure include ballast circuitry for an LED-based lighting fixture capable of operating with standard phase modulated dimmer switches. The ballast circuitry is simple and inexpensive. In one embodiment, a pulse width modulator operating at a fixed switching frequency and duty cycle controls a gate MOSFET which transfers power through a transformer that supplies the LEDs with power. Depending on the average power supplied to the ballast from the phase controlled dimmer, the LEDs appear to the human eye to dim.

In accordance with one embodiment, a lighting fixture adapted to be dimmable by a thyristor-based dimmer is provided. The fixture comprises a power conditioning unit adapted to accept an AC electrical input and having an output, the power conditioning unit and a lighting unit. The power conditioning unit comprises a switching MOSFET, a control circuit, and a transformer. The control circuit is adapted to output a switching clock cycle and duty cycle that are generally fixed during normal operation of the power conditioning unit. The duty cycle and clock cycle are adapted to gate the switching MOSFET. The transformer has a primary winding configured to store electrical energy when the MOSFET is gated on. A secondary winding of the transformer receives electrical energy from the primary winding and delivers it to the outlet. The lighting unit is connected to the power conditioning unit output and is adapted to receive electric power therefrom. The lighting unit comprises one or more light emitting diodes (LEDs). The duty cycle, clock and transformer are chosen so that the primary winding discharges substantially all of the energy stored therein at least once per a predetermined number of clock cycles.

In another embodiment, the duty cycle, clock and transformer are chosen so that the primary winding discharges substantially all of the energy stored therein every clock cycle. In one embodiment the power conditioning unit and lighting unit collectively emulate a resistor during normal operation.

In yet another embodiment, the power conditioning unit comprises an over-voltage protector configured to automatically adjust the duty cycle to prevent damage due to a non-normal operating condition in which the load voltage exceeds a rated voltage of the fixture.

In a still further embodiment, the power conditioning unit comprises a manually-adjustable variable resistor configured to adjust the switching frequency. In one such embodiment, the variable resistor is adapted to be adjusted during manufacture of the power conditioning unit so as to calibrate the switching frequency to a chosen value. In another embodiment, the variable resistor is not accessible for adjustment during normal operation of the power conditioning unit.

In an embodiment, an impedance matching resistor is connected in series between a thyristor-based dimmer and the rest of the power conditioning unit, wherein the impedance matching resistor is chosen to prevent a false trigger by the thyristor-based dimmer.

In accordance with another embodiment, the power conditioning unit is configured to operate at a rated voltage during normal operation. The control circuit is configured so that when a load voltage differs significantly from the rated voltage, a non-normal condition is indicated, and the duty cycle is adjusted so as to adjust the power delivered to the load until the load voltage generally corresponds to the rated voltage. Once the load voltage generally corresponds to the rate voltage the power conditioning unit returns to a normal condition.

In still another embodiment, the transformer is configured to provide electrical isolation between the lighting unit and the relatively high input voltage. In another such embodiment, the power conditioning unit is enclosed within a housing, and a pair of apertures are formed through the housing to provide access to the power conditioning unit output, and a relatively low voltage is arranged across the output.

In accordance with another embodiment, the present invention provides a method of dimming an LED using a thyristor-based dimmer. The method comprises providing an LED, providing an LED driver comprising a substantially fixed operating frequency clock and a transformer, providing a thyristor-based dimmer adapted to supply a power to the LED driver, and supplying power to the transformer as a function of the duty cycle so as to charge the transformer. The transformer is adapted to substantially fully discharge at least once per a predetermined number of clock cycles. The method further includes directing at least a portion of the energy discharged from the transformer to the LED.

In another embodiment, the method additionally comprises providing a variable resistor configured to adjust the operating switching frequency, and adjusting the variable resistor to adjust the switching frequency.

In accordance with a further embodiment of the present invention, a light emitting diode dimming circuit is provided for use with a thyristor-based dimmer switch. The light emitting diode dimmer circuit comprises a switching MOSFET, a control circuit configured to provide a clock frequency and a duty cycle gate drive signal for controlling the MOSFET, a transformer configured to store energy and discharge substantially all of the stored energy at least once per a predetermined number of clock cycles, and one or more light emitting diodes configured to receive at least a portion of energy discharged by the transformer. The frequency and duty cycle are generally fixed during normal operation.

In another embodiment, the control circuit is adapted to sense a non-normal operating condition indicated by a changing output voltage. The control circuit is further adapted to change the duty cycle to stabilize output voltage within a preset range. The control circuit maintains normal operation when the output voltage is stabilized.

In yet another embodiment, the present invention provides a system for dimming an LED. The system comprises a thyristor-based dimmer, a lighting portion comprising one or more LEDs, and an LED ballast operably connected between the thyristor based dimmer and the lighting portion. The LED ballast is configured to imitate a resistive load as seen by the thyristor based dimmer.

In a still further embodiment, the LED ballast comprises a switching frequency clock that is substantially fixed during normal operation.

In one embodiment, a lighting fixture has a phase control dimmer configured to supply a power to the power conditioning unit and an impedance matching resistor connected in series between the phase control dimmer circuit and the power conditioning unit. The impedance matching resistor is chosen to prevent a false trigger by the phase control dimmer. In one embodiment, the lighting fixture has a variable resistor configured to adjust the constant duty cycle.

In one embodiment, a method of dimming an LED using a phase control-based dimmer is disclosed. The method includes the steps of: providing an LED; providing an LED driver comprising a constant duty cycle and constant frequency clock and a transformer; providing a phase control-based dimmer adapted to alter power supplied to the LED driver by a power supply; and supplying power to the transformer as a function of the duty cycle so as to charge the transformer. The transformer is adapted to substantially fully discharge once per a predetermined number of clock cycles and directs at least a portion of the discharged energy to the LED.

In one embodiment, the transformer is adapted to substantially fully discharge once per clock cycle. In one embodiment, the transformer is adapted to provide electrical isolation. In one embodiment, the LED driver further comprises a screw-plug connection. In one embodiment, the method of dimming an LED includes the step of adjusting the constant duty cycle to prevent damage due to a malfunction. In one embodiment, the method of dimming an LED includes the steps of providing a phase control dimmer configured to supply a power to the power conditioning unit and providing an impedance matching resistor connected in series between the phase control dimmer circuit and the power conditioning unit. The impedance matching resistor is chosen to prevent a false trigger by the phase control dimmer. In one embodiment, the method of dimming an LED includes the steps of providing a variable resistor configured to adjust the constant clock frequency by adjusting the variable resistor. In one embodiment, the step of adjusting the variable resistor occurs during manufacturing or before installation.

In one embodiment, a light emitting diode dimming circuit for use with a phase control dimmer switch is disclosed. The light emitting diode dimmer circuit has a substantially fixed frequency clock for outputting a constant duty cycle, a transformer configured store energy and discharge a substantial portion of the stored energy once per a predetermined number of clock cycles. One or more light emitting diodes are configured to receive at least a portion of energy released by the transformer.

In one embodiment, a system for dimming an LED is disclosed. The system for dimming an LED includes a thyristor based dimmer, a lighting portion having one or more LEDs, and an LED ballast operably connected between the thyristor based dimmer and the lighting portion. The LED ballast is configured to emulate a resistive load as seen by the thyristor based dimmer.

BRIEF DESCRIPTION OF THE DRAWINGS

The drawings and the associated descriptions are provided to illustrate embodiments of the disclosure and not to limit the scope of the claims

DETAILED DESCRIPTION OF PREFERRED EMBODIMENTS

Embodiments of the present disclosure include an LED ballast circuit capable of operating with a standard thyristor based phase controlled dimmer switch. A standard 120V AC power is supplied to a phase controlled dimmer switch. The phase controlled dimmer switch adjusts the 120V AC waveform based on the control lever selection. The phase controlled dimmer switch supplies the adjusted waveform to an LED ballast circuit. The waveform is rectified to a DC power supply. A pulse width modulator outputs a fixed duty cycle which controls a transistor such as, for example, a MOSFET. The transistor controls current supplied to a transformer. The transformer receives and releases substantially all of its supplied power once per a predetermined number of clock cycles. The transformer then supplies power to the LEDs which turn on and off in response to the power supplied to them. The LEDs produce an amount of light responsive to the amount of power supplied to the LED.

Figure 1:
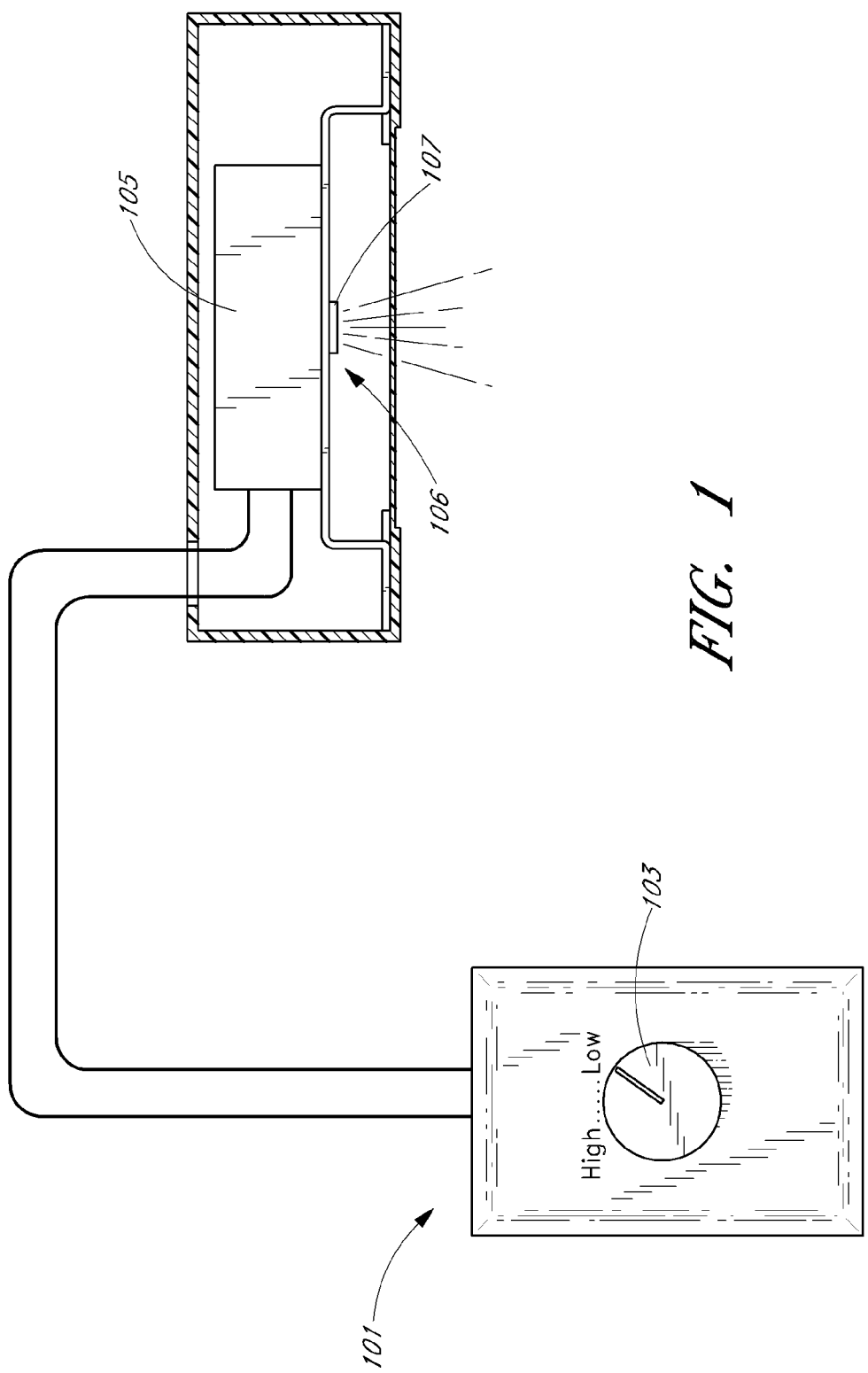
FIG. 1 illustrates a phase controlled dimmer switch operably connected to an LED ballast circuit operably connected LEDs.

FIG. 1 illustrates one embodiment of a phase controlled dimmer-LED lighting scheme. A phase controlled dimmer 101 has a user adjustable control lever 103. The phase controlled dimmer 101 is operably connected to an LED ballast 105 which is operably connected to a lighting unit 106 comprising one or more LEDs 107. In operation, the LEDs 107 are responsive to the LED ballast circuit 105. The LED ballast circuit is responsive to the output of the phase controlled dimmer 101. The output of the phase controlled dimmer 101 is responsive to the lever 103 position. Thus, the LEDs 107 produce an amount of light responsive to the user adjusted position of the lever 103.

Figure 2A:
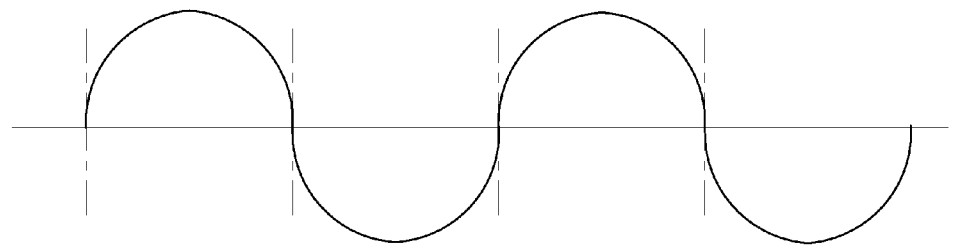
FIG. 2A illustrates a voltage waveform of a standard 120V AC power supply.

Phase controlled dimmers receive as an input, a standard AC power source, such as, for example, a two wire 120VAC, 110VAC, or 220VAC power source. FIG. 2A illustrates a standard 120VAC power source waveform. Although the present disclosure is capable of operating with various AC power sources, embodiments of the present disclosure will be described with respect to a 120VAC power source. It will be understood by a person of skill in the art that the circuit can be adjusted to operate with other power source voltages.

Figure 2B:
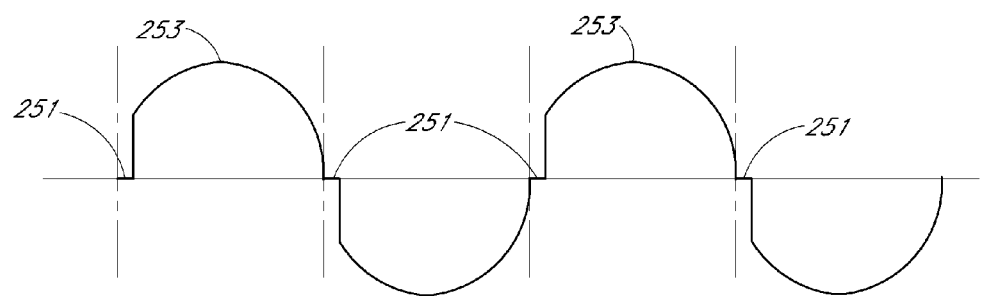
FIGS. 2B-2D illustrate voltage waveforms which have been adjusted by a phase controlled dimmer switch.
Figure 2C:
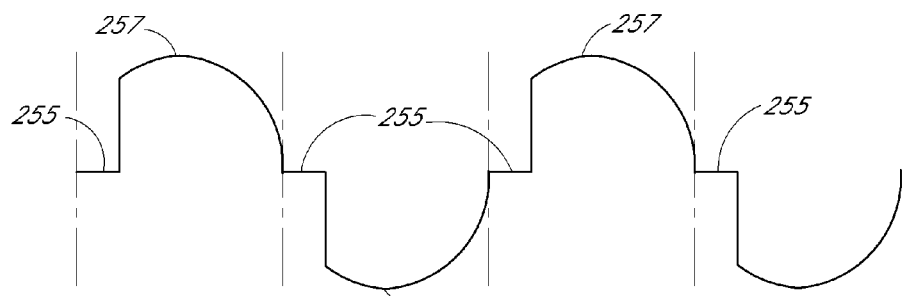
Figure 2D:
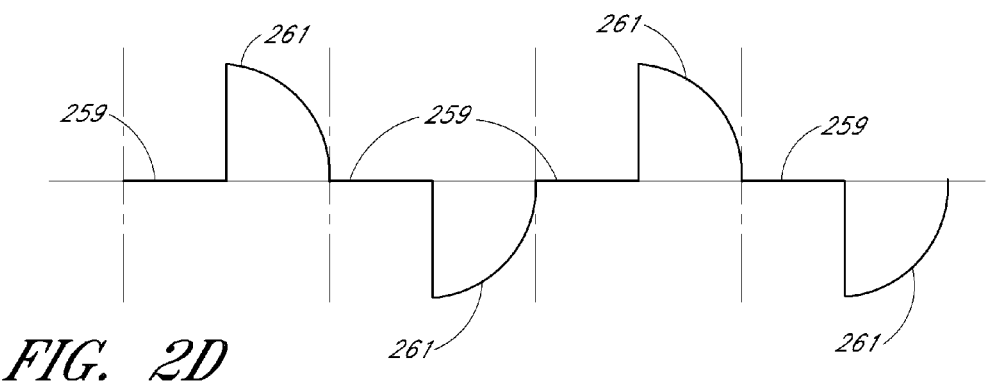

Phase controlled dimmers adjust the voltage waveform by cutting portions of the outputted voltage. FIGS. 2B-2D illustrate examples of possible waveform outputs of a phase controlled dimmer. As can be seen in FIGS. 2B-2D, a section 251, 255, 259 of each pulse 253, 257, 261 has been removed from each waveform. As the switch on the phase controlled dimmer is adjusted, more or less of the waveform is effectively removed by the phase controlled dimmer. These outputted phase controlled waveforms are then supplied to the inputs of an LED ballast circuit.

Figure 3:
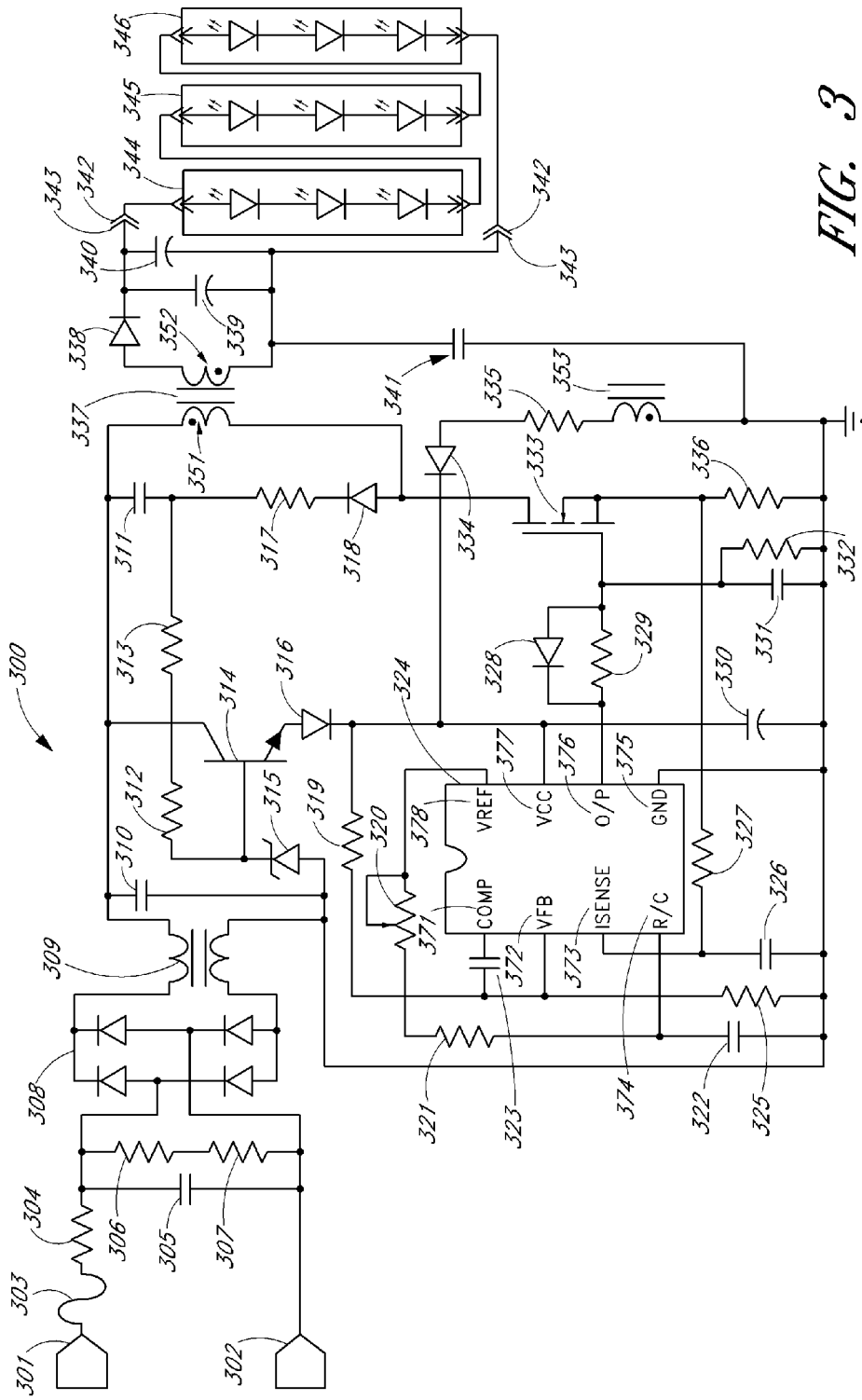
FIG. 3 illustrates one embodiment of a circuit diagram for dimming an LED.

FIG. 3 illustrates one embodiment of a circuit diagram of an LED ballast circuit 300. Ballast circuit 300 has AC inputs 301, 302, fuse 303, resistor 304, capacitor 305, resistor 306, resistor 307, diode bridge 308, EMI inductor 309, capacitor 310, capacitor 311, resistor 312, resistor 313, transistor 314, zener diode 315, diode 316, resistor 317, diode 318, resistor 319, variable resistor 320, resistor 321, capacitor 322, capacitor 323, integrated circuit ("IC") 324, resistor 325, capacitor 326, resistor 327, diode 328, resistor 329, storage capacitor 330, capacitor 331, resistor 332, MOSFET 333, diode 334, resistor 335, resistor 336, transformer 337 with primary winding 351, first secondary winding 352, and second secondary winding 353, diode 338, capacitor 339, capacitor 340, capacitor 341, male and female connectors 342, 343, and a lighting unit 106 comprising LED light modules 344, 345, 346. In the illustrated embodiment, each LED module 344, 345, 346 comprises 3 LEDs arranged electrically in series. It will be understood by a person of skill in the art that any number of LED modules can be used with the circuit of the present invention. In addition, any number of LEDs can be arranged either in series or in parallel or both on each LED module.

Figure 3A:
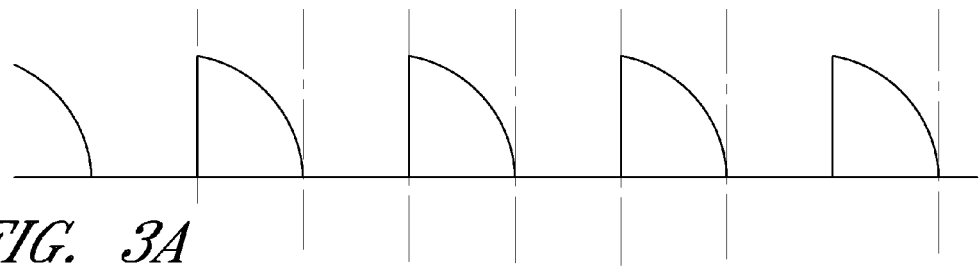
FIG. 3A illustrates a voltage waveform of a rectified phase controlled dimmer adjusted power supply.
Figure 3B:
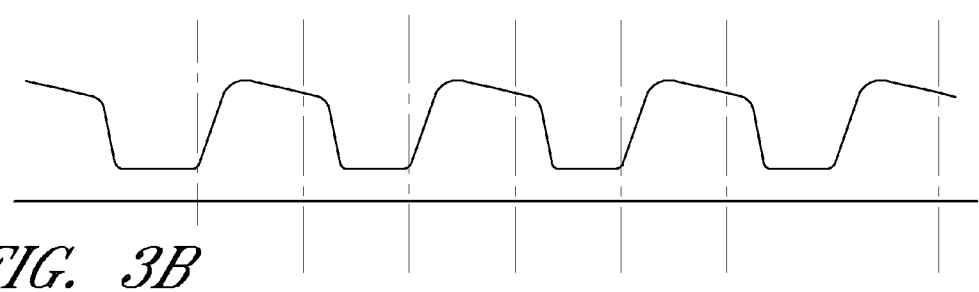
FIG. 3B illustrates the input capacitor voltage waveform of a rectified phase controlled dimmer adjusted power supply.

With continued reference to FIG. 3, the power supplied by the phase controlled dimmer is applied across the terminals 301, 302. The voltage applied across the terminals 301, 302 flows through impedance matching resistor 304, diode-bridge 308, EMI inductor 309, and into high frequency filter capacitor 310. The voltage is rectified as it passes through the diode-bridge 308, and becomes a pulsating DC voltage on filter capacitor 310. FIG. 3A illustrates an example of the rectified phase controlled waveform of FIG. 2D. FIG. 3B illustrates the rectified waveform after being regulated by the input capacitor 310. The voltage then feeds through transistor 314, regulated by zener 315, and charges storage capacitor 330. Resistors 312 and 313 are used to modify the current provided to charge the capacitor 330. Storage capacitor 330 provides a substantially constant DC voltage to IC 324. This allows the IC 324 to have a proper supply voltage even at lower, including zero voltage, voltage portions of each AC cycle. The capacitor 330 stores and releases the supplied power, effectively creating a relatively steady and substantially constant power supply to the IC 324. Resistor 335 and diode 334 provide a secondary power supply to the capacitor 330 from second secondary winding 353. Resistor 335 limits the inrush current through diode 334. Capacitor 341 provides a common mode shunting for the high switching noise from getting out of the ballast.

Figure 3C:
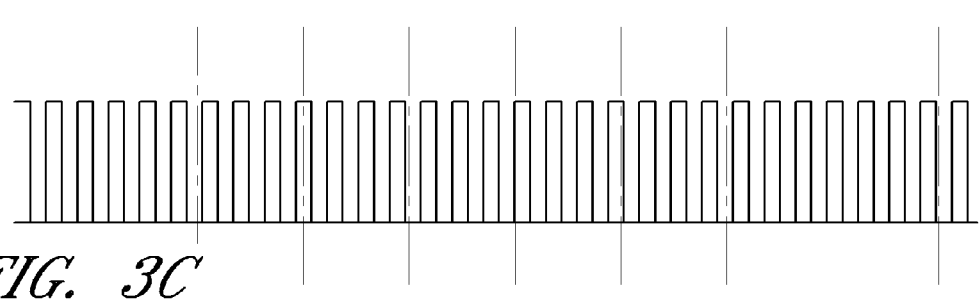
FIG. 3C illustrates a pulse width modulated output gate drive to the MOSFET waveform.

In one embodiment, IC 324 is a standard current mode control PWM. In one embodiment, the IC 324 is a UC3845 IC. commercially available from Fairchild Semiconductor™, Motorola™, or Texas Instruments™ among other IC manufacturers. Preferably, the IC 324 is adapted to provide a constant frequency, constant duty-cycle gate drive signal to the MOSFET 333. Variable resistor 320, resistor 321 and capacitor 322 form an R/C oscillator circuit which oscillates at a constant frequency. IC 324 has VCC 377 for supplying power to the chip, and GND 375 for referencing ground. IC 324 also has VFB 372, COMP 371, VREF 378, R/C 374, O/P 376, and ISENSE 373. A reference voltage level is outputted at the VREF output 378. Depending on the values of the resistors 320, 321 and the capacitor 322, associated with the R/C input 374, the duty cycle of the IC 324 can be programmed or adjusted. After adjusting to a desired setting, the frequency and duty cycle are substantially fixed. The duty cycle is outputted at O/P output 376. FIG. 3C illustrates an example of a duty cycle waveform created by the IC 324. ISENSE 373 is described below with reference to current sense resistor 336.

The choice of which duty cycle to apply affects the efficiency and longevity of the LEDs. A duty cycle of about 40-50% is preferred for efficiency and longevity; however, any duty cycle in the range of 0-90% can be used. In another embodiment, the duty cycle ranges from about 0-90%. In yet another embodiment, the duty cycle ranges from about 35-60%. In one embodiment, the duty cycle ranges from about 40-50%. Although there is no limit to the operating frequency that can be used with the embodiments of the present disclosure, a higher frequency will reduce the magnetic size but result in lower efficiency. A frequency in the range of about 20 KHz to 100 KHz results in a preferred compromise between efficiency, size, and cost.

The duty cycle output goes through resistor 329 and diode 328, before driving the gate of the MOSFET 333. When duty cycle output is high, the MOSFET 333 is gated on and power will flow from the rectified voltage on capacitor 310 through the primary winding 351 of transformer 337. When the duty cycle output is low, the MOSFET 333 is gated off and power is not supplied to the transformer 337. Resistor 329 and capacitor 331 limit the gate-drive current to MOSFET 333 and slow down the turn on time for MOSFET 333. This reduces electromagnetic interference (EMI). Diode 328 bypasses resistor 329 when the IC 324 turns off MOSFET 333, speeding up the turn off process. Resistor 336 is a bleeder resistor to ensure MOSFET 333 will stay off before IC 324 is energized. Resistor 336 senses the MOSFET 333 switching current and provides a feedback through resistor 327 to the IC 324 current sense pin ISENSE 373. Capacitor 326 filters the high frequency switching noise from falsely triggering the internal circuitry of the current sense pin ISENSE 373. Resistor 317 and diode 318 provide the path for the magnetizing current stored in the transformer's 337 primary winding 351 to reach the capacitor 311. Resistors 313 and 312 use this energy to keep the transistor 314 turned on.

Figure 3D:
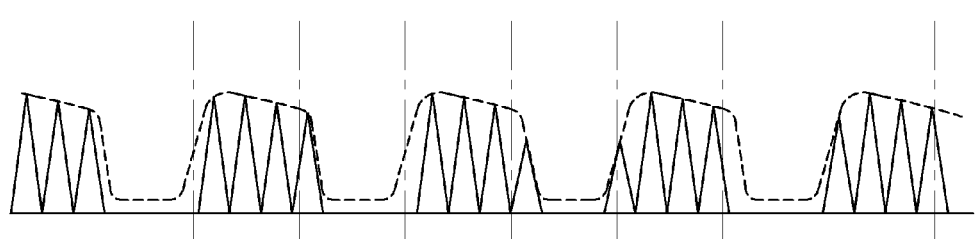
FIG. 3D illustrates the flux stored and released in the transformer of FIG. 3.

When the MOSFET 333 is gated on, current flows through the transformer 337 according to the following equation:

$$I(t) = \left(\frac{Vin}{L}\right) * T \quad (1)$$

where Vin is the voltage supplied to the capacitor 10, L is the inductance of the primary windings 351, and T is the amount of time that voltage is being supplied to the transformer. As described below, the total time (T) that voltage will be supplied to the transformer will be substantially the same in each switching cycle because the duty cycle supplied by the IC 324, which gates on and off the MOSFET 333, is substantially fixed during normal operation, and the transformer releases substantially all of its stored energy every clock cycle. FIG. 3D schematically Illustrates the flux stored and released in the transformer of FIG. 3. As shown, during portions of the electrical supply curve cut out by the phase-control dimmer, substantially reduced or no flux is stored in the transformer.

The magnetic flux first stored in the transformer primary winding 351 is supplied to the transformer secondary windings 352, 353 after the MOSFET 333 turns off. Thus, the peak current in the primary inductance in each clock cycle can be expressed according to the following equation:

$$Ipk = \left(\frac{Vin}{L}\right) * t \quad (2)$$

where Ipk is the peak current in the primary inductance and t is the amount of time the MOSFET 333 is gated on. The energy stored in the primary windings 351 in each switching cycle can be expressed by the following equation:

$$E = \tfrac{1}{2} L * (Ipk)^2 \quad (3)$$

where E is the energy stored in the primary windings 351. Substituting equation 2 into equation 3, E can be described as:

$$E = \frac{1}{2} L * \left(Vin * \frac{t}{L}\right)^2 \quad (4)$$

which can be rewritten as:

$$E = \frac{1}{2} \frac{(Vin * t)^2}{L} \quad (5)$$

Depending on the transformer turn ratio, a substantial portion of the stored energy (E) can be delivered through the first secondary winding 352 and the diode 338 to the capacitor 339. In a preferred embodiment, on each switching cycle, substantially all of the energy (E) stored in the primary windings is released to the first and second secondary winding 352, 353. In another embodiment, substantially all of the energy (E) stored in the primary windings is released to the first and second secondary windings 352, 353 after a predetermined number of duty cycles. Because the switching frequency is fixed, the power delivered to the LEDs can be calculated as follows:

$$P = E * F \quad (6)$$

where F is the frequency of the ballast circuit and P is the power transferred to the LEDs. Substituting equation 5 into equation 6, P becomes:

$$P = \frac{1}{2} \frac{(Vin * t)^2}{L} * F \quad (7)$$

The duty cycle (D) of the IC 324 can be expressed according to the following equation:

$$D = t * F \quad (8)$$

Equation 7 can be rewritten as:

$$P = \frac{1}{2} \frac{(Vin)^2 * t * F}{L * F} * t * F \quad (9)$$

Substituting equation 8 into equation 9, power (P) delivered to the LEDs can be written as:

$$P = \frac{1}{2} \frac{(Vin)^2 * D}{L * F} * D \quad (10)$$

which can be rewritten as:

$$P = \frac{(Vin)^2}{\left(\frac{2L * F}{D^2}\right)} \quad (11)$$

Because both F and D are fixed during normal operation of the ballast circuit, the effective resistance of the LED ballast circuit as seen by inputs 301 and 302 is:

$$Reff = \frac{2L * F}{D^2} \quad (12)$$

Substituting equation 12 into equation 11:

$$P = \frac{(Vin)^2}{(Reff)} \quad (13)$$

Preferably, L, F, and D are all generally fixed values during normal operation of the ballast circuit. The power (P) delivered to the LEDs is, therefore, a function of the voltage input (Vin), and during normal operation the ballast behaves like a resistor.

The phase controlled dimming switch 101 effectively sees a resistor value, effective resistance (Reff), across the voltage inputs 301, 302. If a pure resistive load were placed across the inputs 301, 302, instead of the rest of the circuit in FIG. 3, the power delivered (Pd) to the load would be effectively represented by:

$$Pd = \frac{(Vin)^2}{R} \quad (14)$$

where R is the resistive load, such as an incandescent light bulb. Note that equation 14 is similar to equation 13. Phase controlled dimmers typically are made using thyristors to control the AC input as described above. These dimmers are designed to work with a resistive load, such as an incandescent lamp. When a capacitor is seen on the load of a thyristor, the thyristor can be falsely triggered, causing an undesirable amount of power to be delivered to the ballast circuit and LED module. Because the ballast circuit of the present disclosure behaves like a resistive load, the phase controlled dimmer works properly and false triggering is avoided.

With continued reference to FIGS. 1 and 3, in one embodiment, the transformer provides electrical isolation, which reduces the risk of a shock to a user. The transformer steps down the voltage from relatively high levels, such as line voltage, to lower levels that are safe for human contact. As such, the transformer provides isolation to the lighting/load unit 106 so that a user who touches the LEDs, or portions of the circuit in the lighting/load unit, will not receive a dangerous electrical shock from the voltage flowing through the circuit and LEDs, because the load unit is isolated from the relatively high voltage within the main ballast circuit. This provides a significant safety measure for the user.

In one embodiment, an automatic LED over-voltage protection feature is provided. The LED over-voltage protection feature provides voltage feedback from the load unit, which includes the LEDs. This is useful in guarding against malfunctions in the LEDs or elsewhere in the load, such as an external LED load failure, or another abnormal condition. An external LED load failure can include, for example, the removal of one or more LEDs from the load, an open circuit, or other malfunction which may cause the voltage on the LEDs to rise. The overload-protection feature enables the circuit to limit the voltage supplied to the LEDs to prevent the remaining LEDs, or the rest of the circuit, from being damaged.

When the voltage across the primary windings 351, and thus the LEDs, rises, the voltage increase is reflected across the second secondary windings 353. This will cause the voltage across capacitor 330 to increase approximately proportional with the second secondary winding 353 output voltage. Resistor 319 and 325 divide this voltage down to a lower level and compare with the IC 324 reference voltage 378. If the divided voltage on VFB 372 exceeds the internal reference voltage, the IC 324 will automatically reduce the VCOMP 371 voltage output, which will in turn reduce the duty cycle, reducing the amount of time the MOSFET 333 is gated on. The duty cycle is adjusted until the divided voltage is equal to or less than the internal reference voltage. This reduces the amount of power supplied to the transformer and the LEDs while maintaining approximately the same voltage level. Thus, in an abnormal state, the duty cycle is adjusted so as to stabilize and limit the output voltage. Once the voltage is stabilized as appropriate, the ballast circuit returns to normal operation, in which the duty cycle remains substantially fixed at its adjusted position.

The over-voltage feature just discussed provides safety and durability, preventing the fixture from being damaged due to load failures or the like. In another embodiment the same or a similar circuit structure provides operational voltage regulation. For example, in one embodiment, a rated voltage is chosen corresponding to a desired voltage load. The internal reference voltage may be chosen to correspond with the sensed voltage across the load. Most preferably, the divider ratio of resistors 319 and 325 is chosen so that the divided voltage corresponds to the internal reference voltage when the load is connected and operating properly. In such an embodiment, adjustments will be automatically made in order to keep the voltage generally constant.

For example, if the load is increased, such as by adding an LED module in parallel with the existing load, current drawn through the load will tend to increase. Since the amount of power being supplied remains constant, the voltage will decrease. Upon detecting the decrease in voltage, the IC 324 will increase the duty cycle, thus increasing power output, and correspondingly increasing load voltage until the rated nominal voltage is obtained. Once the rated voltage is obtained, the ballast circuit returns to normal operation, in which the duty cycle and switching frequency are held generally constant.

In the opposite situation, such as when the load is decreased, such as by removing an LED module from a parallel disposition, the IC 324 will sense a load voltage increase, and will reduce the duty cycle until the rated, nominal voltage is maintained. The ballast circuit then reverts to normal operation. In summary, the voltage is maintained at a generally constant level defined by a rated voltage of the device, but the circuit will automatically adjust power output to correspond appropriately to the load. Further, the ballast and associated load behave like a resistor during normal operation, and thus retain the capability of being dimmed by a phase-control-based dimmer.

In another embodiment, a light fixture construction system is provided in which the ballast is rated for a particular voltage, and a plurality of light fixtures are adapted to carry LED-based loads corresponding to the rated voltage, but each fixture has features corresponding to unique power needs. For example, a first fixture employs one LED module, a second fixture employs two identical LED modules arranged in electrical parallel, and a third fixture employs three identical LED modules arranged in electrical parallel. Each of these fixtures suitably use the same ballast circuit for power delivery, and the ballast adjusts duty cycle to provide suitable power and to maintain generally the same voltage for the load of each fixture. Once the initial adjustment is made, the ballast circuit operates in a normal condition; the duty cycle is kept generally fixed and the fixture is dimmable by a typical phase-control-based dimmer. In further embodiments, more or less than three modules may be employed.

Further embodiments may include additional fixture variations. For example, instead of single LED modules arranged in parallel, one, two, three or more groups of one or more serially-arranged LED modules may be arranged so that the groups are in parallel. In still further embodiments, groups may not necessarily include only LED modules, but can include other electrically-powered devices corresponding to the fixture, such as lighting sensors, RF generators and/or receivers, a controller, or the like. Such devices may be provided alone or in combination with other devices and/or LED modules. As discussed above, preferably one model of a ballast circuit may appropriately power a plurality of fixtures/loads that are configured to work with the ballast's rated voltage. After an initial adjustment for the particular load, the ballast operates normally, providing a constant duty cycle and switching frequency, and thus behaves substantially like a resistor.

In one embodiment, the second secondary winding 353 provides a second power supply to IC 324, reducing the current demand and power dissipation on transistor 314. This has the effect of increasing the efficiency and reducing the temperature rise of the ballast circuit.

In one embodiment, an automatic LED load over-current protection feature is provided. This protection feature has a current sense resistor 336 which senses the switching current of the MOSFET 333. As the current running through the resistor 336 increases, the voltage across the resistor also increases proportionally. ISENSE input 373 of IC 324 is responsive to the voltage across resistor 336. In normal operation, the current and the voltage across the current sense resistor 336 will be low. However, when the voltage on the current sense resistor rises above a predetermined threshold, the ISENSE input 373 responds by triggering the preset protection internal to the IC 324 to reduce the time the MOSFET 333 is gated on. This reduces the current flowing in the MOSFET 333 which in turn will protect the ballast and LED from destruction by abnormal load conditions.

In one embodiment, an impedance matching resistor 304 is provided. The impedance matching resistor 304 is selected to connect in series with the AC input circuitry. The resistance of this resistor is selected to have low resistance to minimize the power wasted on the resistor 304, yet, have a high enough resistance so that the solid-state phase controlled dimmer switch will not be falsely triggered due to the presence of capacitor 310. A capacitive load can cause the phase controlled dimmer to experience a phase shift making it trigger at the wrong time. The phase shift can cause an undesirable amount of power to be delivered to the intended load. As described above, capacitor 310 is used to filter the high frequency switching current, and average the switching current, so that the ballast circuit can behave like a pure resistor.

In one embodiment, components with tight tolerances are used to make the ballast circuit predictable. Preferably, a variable resistor 320 is provided to adjust for tolerance requirements and allow lower tolerance components to be used. Lower tolerance components are generally less expensive than higher tolerance components. The variable resistor 320 is connected in series with the frequency setting resistor 321. The variable resistor 320 is adjusted during manufacturing in order to adjust the switching period (T). The switching period adjusts the effective resistance (Reff) of the circuit, and thus the power supplied to the LEDs. The variable resistor 320 allows for final trimming of the LED ballast output power to a consistent specified level in production. In a preferred embodiment, once the variable resistor 320 is set, or calibrated, so that the ballast circuit behaves as desired, the setting of the resistor 320 is not changed. In another preferred embodiment, once resistor 320 is appropriately set, the circuit structure is at least partially encased in a resin, and a user does not have access to further set the resistor 320.

Figure 4:
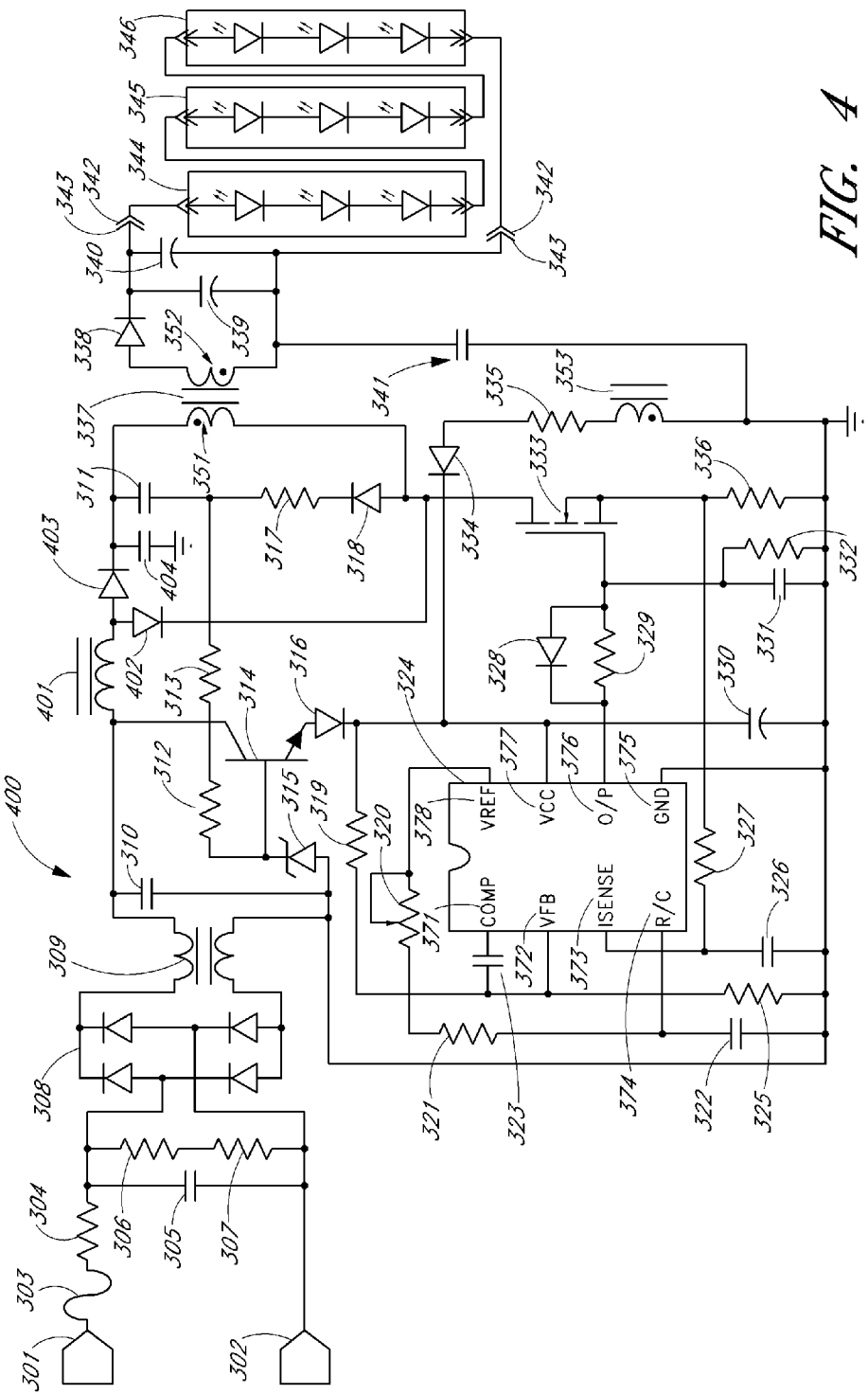
FIG. 4 illustrates another embodiment of a circuit diagram for dimming an LED.

FIG. 4 illustrates another embodiment of an LED ballast circuit for dimming an LED. The illustrated LED ballast circuit has all of the components as the circuit described with respect to FIG. 3, with the added components of a third secondary winding 401 of transformer 337, diode 402, diode 403, and capacitor 404. These components are added to aid in smoothing the power supplied to capacitor 310. With more consistent power, the capacitor 310 can be chosen to have a smaller capacitance. With a small capacitance at capacitor 310, the impedance matching resistor 304 can also be chosen to have a small resistive value. As discussed above, the resistance of impedance matching resistor 304 is selected to have low resistance to minimize the power wasted on the resistor 304, yet have a high enough resistance so that the solid-state phase control dimmer switch will not be falsely triggered due to the presence of capacitor 310. The added components of FIG. 4 allow the impedance matching resistor 304 to have a lower resistance while still maintaining the sufficient impedance matching to prevent the phase controlled dimmer switch from operating improperly.

Figure 5:
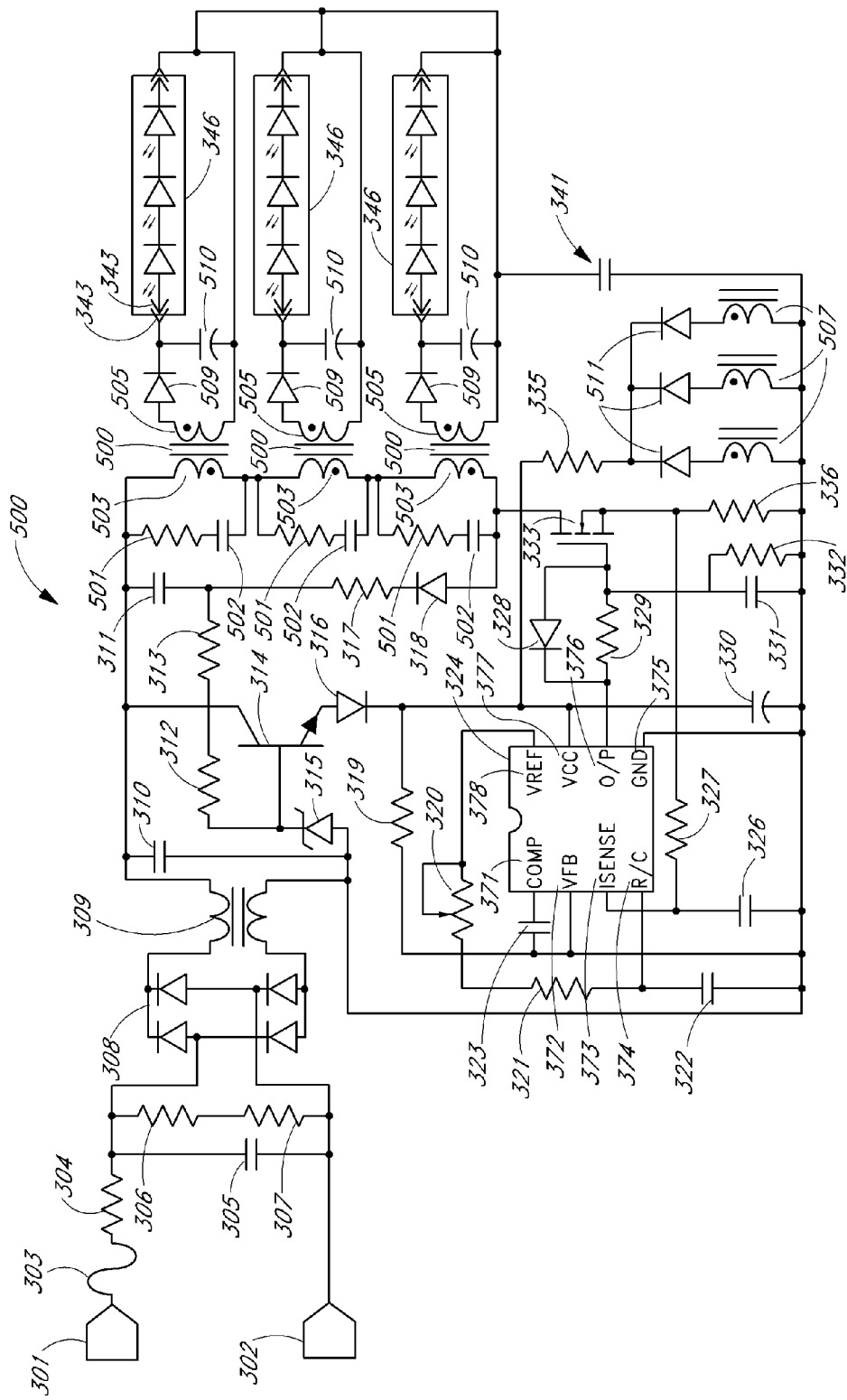
FIG. 5 illustrates yet another embodiment of a circuit diagram for dimming an LED.

FIG. 5 illustrates yet another embodiment of an LED ballast circuit for dimming a load unit having three sub units. The LED ballast circuit of FIG. 5 has many of the same components and operation as that described with respect to FIG. 3. FIG. 5 also includes three separate inductors 500, one for each of 3 load subunits. Resistors 501 and capacitors 502 are provided to reduce the undesirable high frequency oscillation of the transformers 500 that have primary windings 503, first secondary windings 505, and second secondary windings 507. Each first secondary winding 505 supplies a load subunit comprising an LED bank 344, 345, 346 with power. Diodes 509 and capacitors 510 are provided to filter and smooth the power supplied to the LEDs. Second secondary windings 507 and diodes 511 provide the same functionality as second secondary winding 353 and diode 334. Using three separate transformers allows for the power sent to the LEDs to be more equally distributed among each subunit. Providing three subunits allows for lower distribution voltage and easier cooling for each subunit, as well as a lower magnetic profile, allowing the ballast to be packaged in a low profile enclosure. Although three transformer/subunit pairs are employed in the illustrated embodiment, it is to be understood that two, three, four or more such pairs may be suitably used.

In the embodiment illustrated in FIG. 5, components values are generally chosen from standard component values. For example, in a preferred embodiment, the component values for the components in FIG. 5 are: fuse 303: about 1 A, 250V; impedance matching resistor 304: about 47 ohms, 5 W; capacitor 305: about 104 Pf, 250V, XCAP; resistor 306: about 470K, ¼ W, 5%; resistor 307: about 470K ohms, ¼ W, 5%; capacitor 310: about 2.2 Uf, 200V, FILM; capacitor 311: about 0.01 uF/500V, CER; resistor 312: about 100K ohms, ¼ W; resistor 313: about 100K ohms, ¼ W; resistor 317: about 100 ohm, ¼ W; resistor 319: about 150K ohms, 0805; variable resistor 320: about 2K ohms; resistor 321: about 680 ohms, 0805, 5%; capacitor 322: about 0.01 uF, 16V, 0805; capacitor 323: about 0.1 uF, 16V, 0805; resistor 325: about 27K ohm, 0805, 5%; capacitor 326: about 330 Pf, 16V, 0805; resistor 327: about 510 ohm, 0805; resistor 329: about 100 ohm, 0805; storage capacitor 330: about 100 Uf, 25V, AL; capacitor 331: about 1000 pF, 50V, CER; resistor 332: about 470K ohms, ¼ W, 5%; resistor 335: about 10 ohms, ¼ W, 5%; resistor 336: about 1 ohm, 1 W; transformers 500: about 230 uH; capacitors 510: about 10 Uf, 25V, AL; resistors 501: about 1K ohms, ¼ W, 5%; and capacitors 502: about 100 pF, 200V, CER. The foregoing component values are provided by way of example and not by way of limitation. It will be understood by a person of skill in the art that various other component values can be used with the present disclosure.

In one embodiment, standard components are chosen. For example, in the embodiment of FIG. 5, diode bridge 308 can be a KBP206G diode bridge, transistor 314 can be a 2SC4620 transistor, zener 315 can be an RLZ15C zener, diode 316 can be a 1N4148 diode, IC 24 can be a UC3845, diode 318 can be a 1N4007 diode, transformers 500 can be CS127125 transformers, diodes 509 can be SB160 diodes, diodes 511 can be 1N4148 diodes, MOSFET 333 can be a 4NQ60E MOSFET, and diode 328 can be a 1N4148 diode.

In one embodiment, the ballast circuit of the present disclosure is incorporated into a housing to form part of a Luminaire. In one embodiment, the LED luminaire has a modular construction. The load unit comprises LEDs disposed on one or more modules, and the modules and ballast circuit housing are attached to a mounting structure to construct the luminaire.

Figure 6A:
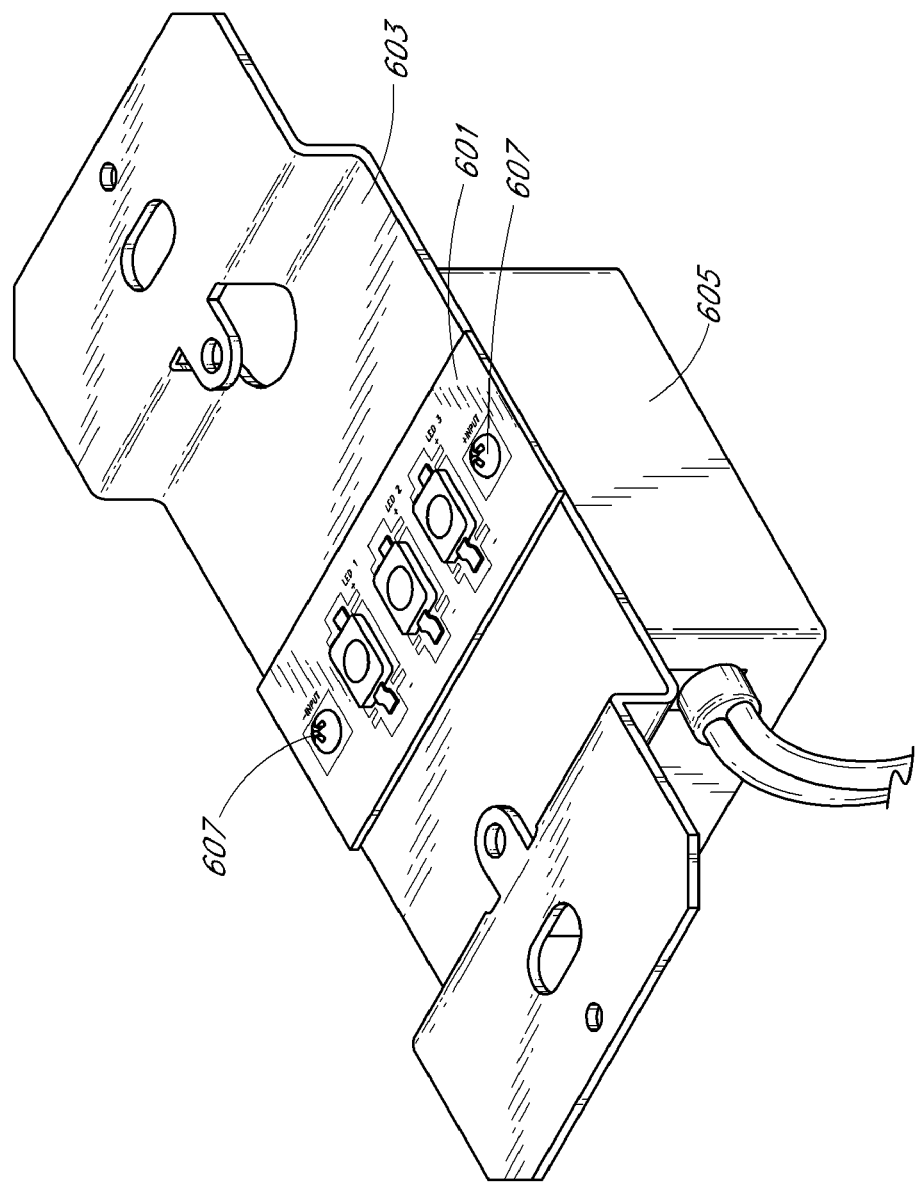
FIG. 6A illustrates one embodiment of an LED luminaire.
Figure 6B:
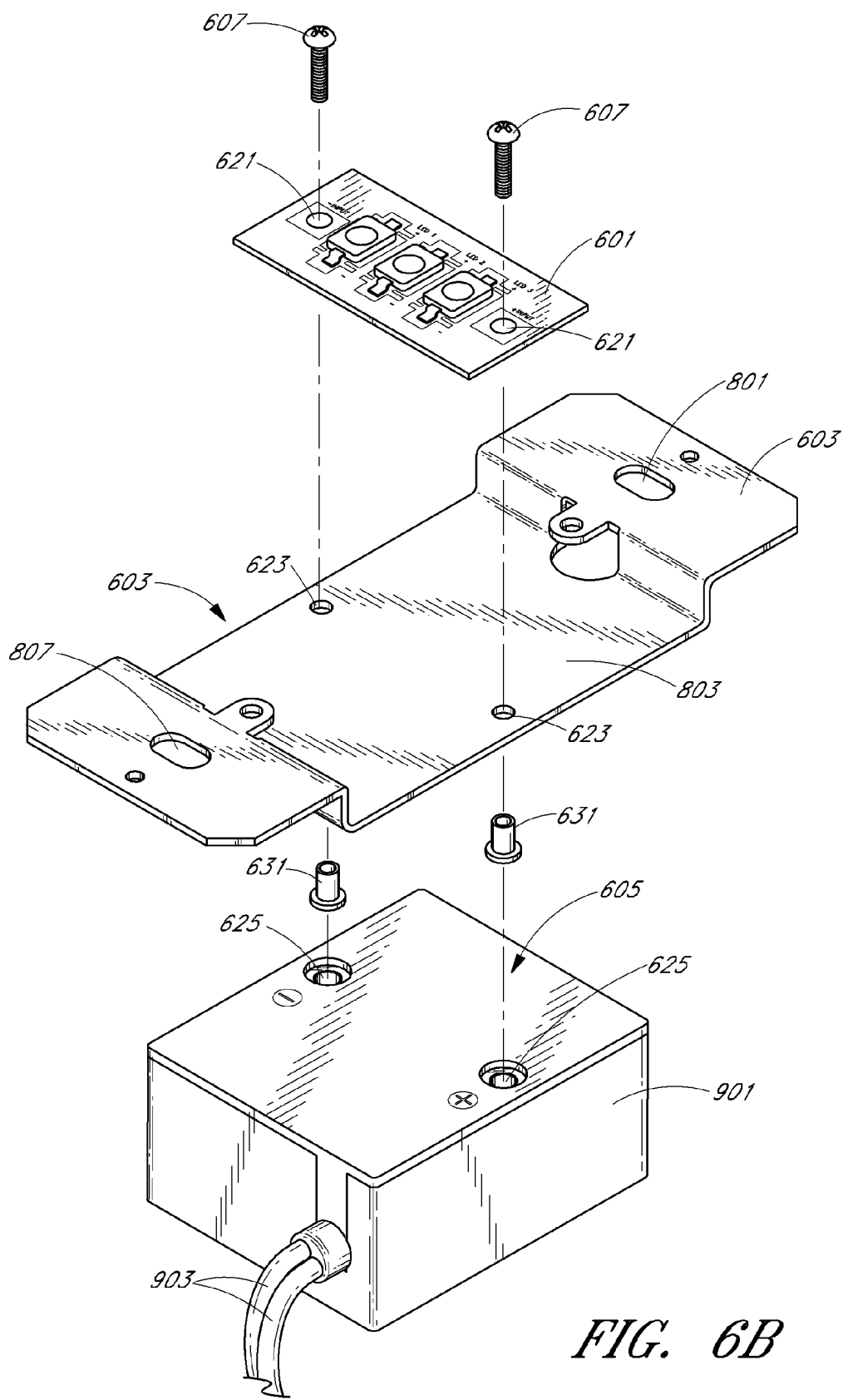
FIG. 6B illustrates an exploded view of the LED luminaire of FIG. 6A.

FIG. 6A-6B illustrate one embodiment of an LED luminaire. The luminaire includes an LED module 601, a mount member 603, and a driver 605. A pair of threaded fasteners 607 secure the module 601 onto the mount member 601 and the driver 605. The fasteners 607 extend through mounting holes 621, 623 formed through the module 601 and mount member 603, respectively, and engage threaded mount members 625 arranged in the driver 605. The fasteners 607 communicate electrical power from the driver 605 to the LED module 601. Nonconductive inserts 631 electrically insulate the fasteners 607 from the mount member 603.

Figure 7:
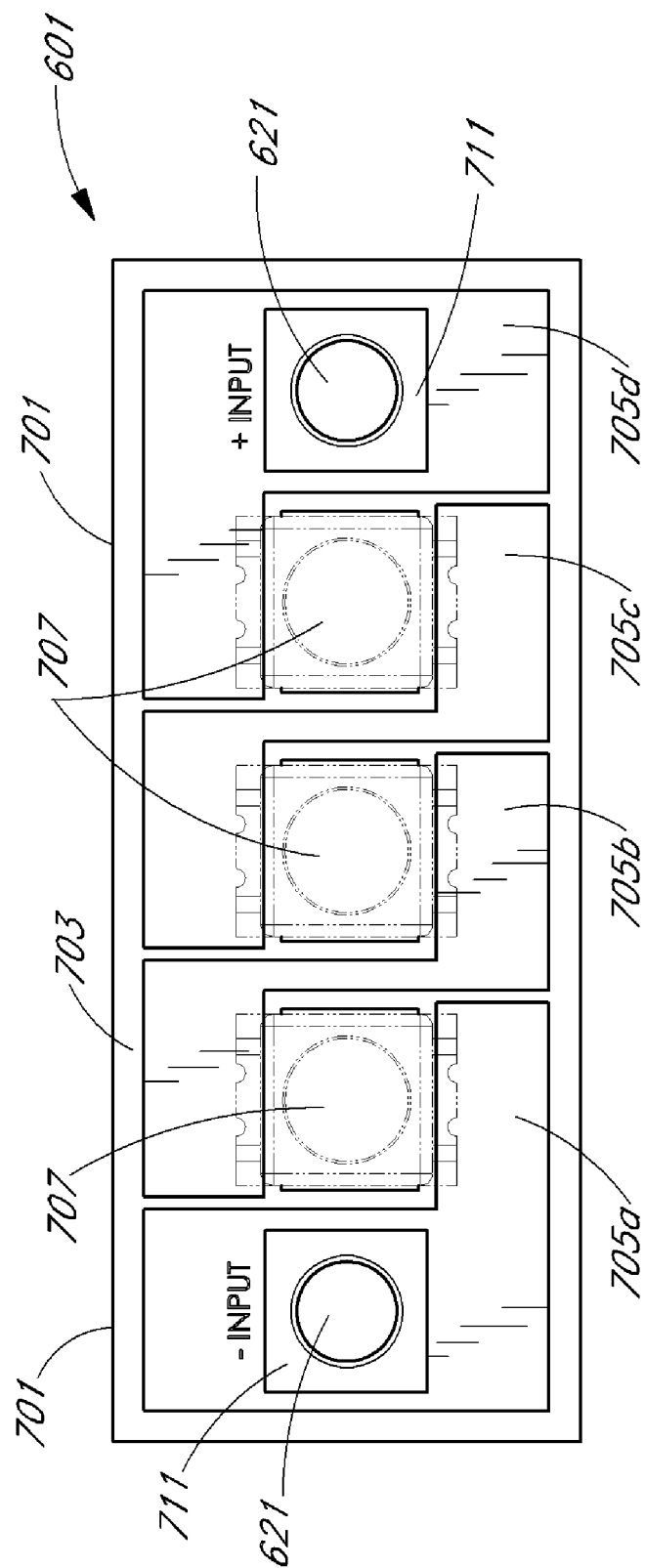
FIG. 7 illustrates one embodiment of an LED module.

With reference next to FIG. 7, the LED module 601 preferably comprises a module body 701 having a dielectric layer

703. Conductive contacts 705*a-d* are provided on the dielectric layer 703 opposite the module body 701. LEDs 707 are attached to the contacts 705*a-d* so as to be electrically in series between contact 705*a* and 705*d*. In the illustrated embodiment, the array of LEDs 707 is arranged in series between the mounting holes 621. Input contacts 711 are configured to electricity communicate with the driver 605 via the fasteners 607. The input contacts 711 comprise an area surrounding the mounting holes 621 and communicate electrically with adjacent contacts 705*a, d*.

In the illustrated embodiment, the LEDs comprise white LEDs in an electrical series arrangement. It is to be understood that LEDs having different colors and different power requirements, as well as embodiments having one, two, four, five, six, seven, eight, nine, or more LEDs, may be employed. Further, modules having input contacts may or may not employ mount holes, and electric power may or may not be supplied to the module via a threaded fastener, and may also or instead be supplied by wires, non-threaded fasteners, clips, or the like. In the illustrated embodiment, the module body 701 is heat conductive, and comprises a metal, preferably an aluminum plate. It is to be understood that other types of materials can be used for the module body, including plastics, other metals, ceramics, and the like. Further, although it is generally preferable that the module body 701 have high heat conductance properties, in some embodiments, such properties may not be necessary and thus are not employed.

With continued reference to FIGS. 6A and 6B, the mount member 603 is configured to fit in a typical electrical junction box. As such, mounting apertures 801 are positioned to align with corresponding apertures on such junction boxes. Further, as discussed above, the mount member 603 comprises module mount holes 623 which are configured to align with the mounting holes 621 formed through the module 601 and with mount members 625 of the driver 605. In the illustrated embodiment, the mount member 603 has a substantially flat module mount portion 803 configured to complement the substantially flat module body 701. This complementary configuration facilitates heat transfer between the LED module 601 and mount member 603.

The driver 605 comprises a case 901 that encloses electrical components and circuitry for power conditioning, such as, for example, a ballast circuit. A pair of flexible conductors 903 are configured to connect to line voltage such as 120 VAC and to communicate such line voltage to the driver circuitry. In one embodiment, the flexible conductors 903 connect to the output of a phase controlled dimmer switch which is connected to a voltage. The circuitry within the driver steps down the voltage and rectifies it into a DC voltage that is appropriate for the module. For example, in the illustrated embodiment, the voltage is stepped down to 6-10 volts. Of course, other voltage levels, such as about 30 volts, about 12 volts, or the like are also contemplated.

With continued reference to FIGS. 6A and 6B, mounting members 625 are arranged in the driver 605, and are configured to align with the mounting holes 621, 623 through the module 601 and mount member 603. The mounting members 625 are polarized, meaning that they are configured as part of a circuit path such that when a module is properly installed, it bridges from a positive to a negative mounting member. This completes a circuit, supplying electrical power from a circuit board housed inside the driver housing 901 to the LED module 601. In the illustrated embodiment, the mount members 625 are threaded so as to engage threads of the fasteners 607. Electric power is communicated through the engaged threads. The ballast circuitry is comprised within housing 901 so as to protect it from human contact. Preferably mount members 625 are electrically located on the ballast circuit after power has passed through the transformer 337 so that the mount members 625 are electrically isolated from dangerous voltage levels. As such, in this embodiment, the circuit electrically isolates the mount members 625 from dangerous voltage levels, and the housing 901 physically isolates users from any high-voltage portions of the circuit, and allows access only to the electrically isolated mount members 625. Such physical and electrical isolation reduces the risk of an electrical shock to a user.

Although FIGS. 6A-6B illustrate a luminaire employing only one LED module, a skilled artisan will recognize from the disclosure herein that 2, 3, or 4 or more LED modules can be used with the ballast circuit and housing described herein. In addition, a skilled artisan will recognize that 1, 2, 3, or 4 or more LEDs can be attached to each LED module, either in series or in parallel.

The embodiment illustrated in connection with FIGS. 6A-6B has a single pair of mounts 625, and thus only a single module 601 can be directly connected to the mounts. Applicant contemplates a product system comprising multiple models of ballasts. Some models may be adapted to have different rated operating voltages. Other models are adapted to have varying connector configurations. For example, ballast circuits, and associated housings, having 2, 3, 4 or more sets of connectors are contemplated. Further, embodiments are contemplated in which the connectors are in electrical series, parallel, or combinations thereof. Preferably, each ballast of the product system is adapted to adjust duty cycle to meet the load's power needs and achieve stable operation, and then operates normally, in which the duty cycle is generally fixed.

Although the foregoing invention has been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. It is contemplated that various aspects and features of the invention described can be practiced separately, combined together, or substituted for one another, and that a variety of combination and subcombinations of the features and aspects can be made and still fall within the scope of the invention. Furthermore, the systems described above need not include all of the modules and functions described in the preferred embodiments. Accordingly, the present invention is not intended to be limited by the recitation of the preferred embodiments, but is to be defined by reference to the appended claims.

What is claimed is:

1. A lighting fixture adapted to be dimmable by a thyristor-based dimmer, the fixture comprising:
   a power conditioning unit adapted to accept an AC electrical input and having an output, the power conditioning unit comprising;
   a switching MOSFET;
   a control circuit adapted to output a switching clock cycle and duty cycle that are generally fixed during normal operation of the power conditioning unit, the duty cycle and clock cycle adapted to gate the switching MOSFET;
   a transformer having a primary winding configured to store electrical energy when the MOSFET is gated on, a secondary winding of the transformer receiving electrical energy from the primary winding and delivering it to the outlet; and an over-voltage protector configured to automatically adjust the duty cycle to prevent damage due to a non-normal operating condition in which the load voltage exceeds a rated voltage of the fixture;

a lighting unit connected to the power conditioning unit output and adapted to receive electric power therefrom, the lighting unit comprising one or more light emitting diodes (LEDs);

wherein the duty cycle, clock and transformer are chosen so that the primary winding discharges substantially all of the energy stored therein at least once per a predetermined number of clock cycles.

2. A lighting fixture as in claim 1, wherein the duty cycle, clock and transformer are chosen so that the primary winding discharges substantially all of the energy stored therein every clock cycle.

3. A lighting fixture as in claim 1, wherein the power conditioning unit and lighting unit collectively emulate a resistor during normal operation.

4. A lighting fixture as in claim 3, wherein the power conditioning unit additionally comprises a filter capacitor, a storage capacitor, and a transistor, and wherein power for the control circuit is regulated by the filter capacitor and fed through the transistor to the storage capacitor, and wherein the storage capacitor provides a substantially constant DC voltage to the control circuit.

5. A lighting fixture as in claim 4 additionally comprising a second secondary winding of the transformer, wherein the second secondary winding of the transformer provides a second power supply to the control circuit.

6. A lighting fixture as in claim 5 additionally comprising a third secondary winding of the transformer, wherein the third secondary winding is arranged to smooth power delivery to the filter capacitor.

7. A lighting fixture as in claim 1, wherein the generally fixed duty cycle is between about 35% and about 65%.

8. A lighting fixture as in claim 7, wherein the generally fixed duty cycle is between about 40% and about 50%.

9. A lighting fixture as in claim 1, wherein the power conditioning unit comprises a manually-adjustable variable resistor configured to adjust the switching frequency.

10. A lighting fixture as in claim 9, wherein the variable resistor is adapted to be adjusted during manufacture of the power conditioning unit so as to calibrate the switching frequency to a chosen value, and wherein the variable resistor is not accessible for adjustment during normal operation of the power conditioning unit.

11. A lighting fixture as in claim 1, wherein the power conditioning unit further comprises an impedance matching resistor connected in series between a thyristor-based dimmer and the rest of the power conditioning unit, wherein the impedance matching resistor is chosen to prevent a false trigger by the thyristor-based dimmer.

12. A lighting fixture as in claim 1, wherein the power conditioning unit is configured to operate at a rated voltage during normal operation, wherein the control circuit is configured so that when a load voltage differs significantly from the rated voltage, a non-normal condition is indicated, and the duty cycle is adjusted so as to adjust the power delivered to the load until the load voltage generally corresponds to the rated voltage, at which time the power conditioning unit returns to a normal condition.

13. A lighting fixture as in claim 1, wherein the transformer is configured to provide electrical isolation between the lighting unit and the relatively high input voltage.

14. A lighting fixture as in claim 13, wherein the power conditioning unit is enclosed within a housing, and a pair of apertures are formed through the housing to provide access to the power conditioning unit output, and a relatively low voltage is arranged across the output.

15. A lighting fixture as in claim 1, wherein the power conditioning unit additionally comprises a filter capacitor, a storage capacitor, and a transistor, and wherein power for the control circuit is regulated by the filter capacitor and fed through the transistor to the storage capacitor, and wherein the storage capacitor provides a substantially constant DC voltage to the control circuit, the fixture additionally comprising a second secondary winding of the transformer that communicates with the storage capacitor, and wherein the control circuit is adapted to compare a divided portion of the voltage across the storage capacitor with a reference voltage and reduce the duty cycle if the divided voltage exceeds the reference voltage.

16. A lighting fixture as in claim 15, wherein the control circuit is adapted to increase the duty cycle if the divided voltage is less than the reference voltage.

17. A method of dimming an LED using a thyristor-based dimmer, comprising:

providing an LED;

providing an LED driver comprising a transformer and an operating frequency clock that is has a substantially fixed operating switching frequency once the operating switching frequency is set; providing a variable resistor configured to adjust the operating switching frequency, and adjusting the variable resistor to set the switching frequency;

providing a thyristor-based dimmer adapted to supply a power to the LED driver;

supplying power to the transformer as a function of the duty cycle so as to charge the transformer;

wherein the transformer is adapted to substantially fully discharge at least once per a predetermined number of clock cycles; and directing at least a portion of the energy discharged from the transformer to the LED.

18. The method of claim 17, wherein the transformer is adapted to substantially fully discharge once per duty cycle.

19. The method of claim 17, wherein a duty cycle of the substantially fixed frequency clock is between about 35% and about 60%.

20. The method of claim 17, wherein a duty cycle of the substantially fixed frequency clock is between about 40% and about 50%.

21. The method of claim 17, wherein the transformer is adapted to provide electrical isolation.

22. The method of claim 17, wherein the LED driver further comprises a screw-plug connection.

23. The method of claim 17, further comprising adjusting the substantially fixed switching frequency during manufacturing.

24. A light emitting diode dimming circuit for use with a thyristor-based dimmer switch, the light emitting diode dimmer circuit comprising:

a switching MOSFET;

a control circuit configured to provide a clock frequency and a duty cycle gate drive signal for controlling the MOSFET, the frequency and duty cycle being generally fixed during normal operation;

a transformer configured to store energy and discharge substantially all of the stored energy at least once per a predetermined number of clock cycles; a variable resistor configured to adjust the operating switching frequency, and adjusting the variable resistor to adjust the switching frequency; and one or more light emitting diodes configured to receive at least a portion of energy discharged by the transformer.

25. The light emitting diode dimming circuit of claim 24, wherein the transformer discharges substantially all of the stored energy once per each duty cycle.

26. The light emitting diode dimming circuit of claim 24, wherein the substantially fixed duty cycle is between about 35% and about 65%.

27. The light emitting diode dimming circuit of claim 24, wherein the substantially fixed duty cycle is between about 40% and about 50%.

28. The light emitting diode dimming circuit of claim 24, wherein the transformer is configured to provide electrical isolation.

29. The light emitting diode dimming circuit of claim 24, wherein the control circuit is adapted to sense a non-normal operating condition indicated by a changing output voltage, the control circuit is adapted to change the duty cycle to stabilize output voltage within a preset range, and wherein the control circuit maintains normal operation when the output voltage is stabilized.

30. The light emitting diode dimming circuit of claim 24 additionally comprising an impedance matching resistor arranged to be connected in series with a thyristor-based dimmer circuit, wherein the impedance matching resistor is chosen to prevent a false trigger by the thyristor-based dimmer.

* * * * *

UNITED STATES PATENT AND TRADEMARK OFFICE
CERTIFICATE OF CORRECTION

| | | |
|---|---|---|
| PATENT NO. | : 8,143,805 B2 | Page 1 of 1 |
| APPLICATION NO. | : 12/689201 | |
| DATED | : March 27, 2012 | |
| INVENTOR(S) | : Peng | |

It is certified that error appears in the above-identified patent and that said Letters Patent is hereby corrected as shown below:

On the Title page in column 2 item [56] at line 22, under OTHER PUBLICATIONS, change "Hofman," to --Hofmann,--.

In column 4 at line 13, after "claims" insert --.--.

In column 6 at line 6 (approx.), change "IC." to --IC--.

In column 12 at line 55, change "FIG." to --FIGS.--.

In claim 17, column 16 at line 24, change "frequency clock that is has a substantially" to --frequency clock that has a substantially--.

Signed and Sealed this
Sixteenth Day of October, 2012

David J. Kappos
*Director of the United States Patent and Trademark Office*